(12) United States Patent
Hellman

(10) Patent No.: US 7,573,406 B2
(45) Date of Patent: Aug. 11, 2009

(54) SYSTEM AND METHOD FOR DECODING CONTEXT ADAPTIVE VARIABLE LENGTH CODING

(75) Inventor: Timothy M. Hellman, Concord, MA (US)

(73) Assignee: Broadcom Corporation, Irvine, CA (US)

( * ) Notice: Subject to any disclaimer, the term of this patent is extended or adjusted under 35 U.S.C. 154(b) by 366 days.

(21) Appl. No.: 10/985,501

(22) Filed: Nov. 10, 2004

(65) Prior Publication Data

US 2005/0258255 A1 Nov. 24, 2005

Related U.S. Application Data

(60) Provisional application No. 60/573,527, filed on May 21, 2004.

(51) Int. Cl.
 *H03M 7/40* (2006.01)
(52) U.S. Cl. ............................ 341/67; 341/65; 341/106; 341/107
(58) Field of Classification Search ............... 341/65, 341/67, 106, 107
 See application file for complete search history.

(56) References Cited

U.S. PATENT DOCUMENTS

| 4,646,061 | A | * | 2/1987 | Bledsoe | 341/65 |
|---|---|---|---|---|---|
| 5,363,097 | A | * | 11/1994 | Jan | 341/67 |
| 5,831,559 | A | * | 11/1998 | Agarwal et al. | 341/106 |
| 6,614,365 | B2 | * | 9/2003 | Suzuki et al. | 341/50 |
| 6,646,578 | B1 | * | 11/2003 | Au | 341/67 |
| 6,664,902 | B2 | * | 12/2003 | Andrew et al. | 341/50 |
| 6,842,124 | B2 | * | 1/2005 | Penna | 341/67 |
| 6,856,264 | B2 | * | 2/2005 | Webb | 341/67 |
| 6,954,555 | B2 | * | 10/2005 | Shimada | 382/246 |
| 7,088,269 | B2 | * | 8/2006 | Kadono et al. | 341/67 |
| 2001/0054973 | A1 | * | 12/2001 | Kobayashi | 341/67 |
| 2002/0037062 | A1 | * | 3/2002 | Riess et al. | 375/348 |
| 2003/0048208 | A1 | * | 3/2003 | Karczewicz | 341/67 |
| 2004/0196167 | A1 | * | 10/2004 | Otsuka | 341/67 |

\* cited by examiner

*Primary Examiner*—Linh V Nguyen
(74) *Attorney, Agent, or Firm*—McAndrews, Held & Malloy, Ltd.

(57) ABSTRACT

A system and method that process encoded data, wherein the encoded data is an encoded video stream. The encoded data may be buffered and the characteristics of the buffered encoded data may be determined and used to select a decoding table from a plurality of decoding tables. An encoded word may then be decoded using the selected decoding table. The output of the decoding table may be the corresponding decoded word and the size of the encoded word. The size of the encoded word may be utilized to shift the buffered encoded data. The decoded word may be sent to the appropriate portion of the system.

28 Claims, 4 Drawing Sheets

SYSTEM AND METHOD FOR DECODING CONTEXT ADAPTIVE VARIABLE LENGTH CODING

RELATED APPLICATIONS

This patent application makes reference to, claims priority to and claims benefit from U.S. Provisional Patent Application Ser. No. 60/573,527, entitled "System and Method for Decoding Context Adaptive Variable Length Coding," filed on May 21, 2004, the complete subject matter of which is hereby incorporated herein by reference, in its entirety.

This application is related to the following applications, each of which is incorporated herein by reference in its entirety for all purposes:

U.S. patent application Ser. No. 11/000,731 filed Dec. 1, 2004;
U.S. patent application Ser. No. 10/963,677 filed Oct. 13, 2004;
U.S. patent application Ser. No. 11/112,632 filed Apr. 22, 2005;
U.S. patent application Ser. No. 10/985,110 filed Nov. 10, 2004;
U.S. patent application Ser. No. 10/965,172 filed Oct. 13, 2004;
U.S. patent application Ser. No. 10/972,931 filed Oct. 25, 2004;
U.S. patent application Ser. No. 10/974,179 filed Oct. 27, 2004;
U.S. patent application Ser. No. 10/974,872 filed Oct. 27, 2004;
U.S. patent application Ser. No. 10/970,923 filed Oct. 21, 2004;
U.S. patent application Ser. No. 10/963,680 filed Oct. 13, 2004;
U.S. patent application Ser. No. 11/013,768 filed Dec. 16, 2004;
U.S. patent application Ser. No. 11/102,389 filed Apr. 8, 2005;
U.S. patent application Ser. No. 11/135,929 filed May 23, 2005; and
U.S. patent application Ser. No. 11/000,676 filed Dec. 1, 2004.

FEDERALLY SPONSORED RESEARCH OR DEVELOPMENT

Not Applicable

MICROFICHE/COPYRIGHT REFERENCE

Not Applicable

BACKGROUND OF THE INVENTION

The ITU-H.264 Standard (H.264), also known as MPEG-4, Part 10, and Advanced Video Coding, may be utilized to encode a video stream. The video stream may be encoded on a frame-by-frame basis, and may be encoded on a macroblock-by-macroblock basis. The MPEG-4 standard may specify the use of spatial prediction, temporal prediction, discrete cosine transformation (DCT), interlaced coding, and lossless entropy coding, for example, to compress macroblocks within a video stream.

Video encoders often utilize techniques to compress data before transmission. The decoders are typically designed to decode received encoded data. One coding technique is variable length coding, where symbols with higher probability of occurrence are given shorter codes, and symbols that are less probable are given longer codes. Once a symbol is assigned a certain code, the whole stream of data is encoded using the same code for the same symbol. One problem with using such a technique in systems where data is constantly changing such as, for example, video data, is that certain symbols that may have high probability of occurrences in one portion of the video, may become less likely to occur in other portions of the video. As a result, using the same symbols throughout the video becomes less efficient.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that processes encoded data. The method may comprise selecting decoding information based on characteristics of the encoded data; decoding the encoded data using the selected decoding information; and generating symbols based on the decoded data and the destination of the decoded data. The encoded data may be variable length coded and may comprise an encoded video stream.

In an embodiment of the present invention, the characteristics of the encoded data may comprise the destination of the decoded data. The characteristics of the encoded data may also comprise the method used for encoding the encoded data. In an embodiment of the present invention, the decoding information may comprise lookup tables.

Selecting decoding information may comprise (a) buffering the encoded data; (b) selecting a number of bits that comprise a code word; (c) determining the characteristics of the code word; (d) selecting decoding information based on the characteristics; (e) shifting the buffered encoded data by the number of bits of the code word; and (f) repeating (b) through (e) for a next code word.

The system may comprise at least one processor capable of performing the method that processes encoded data. The system may also comprise memory, wherein the decoding information may be stored in the memory.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention generally relate to a method and system for processing an encoded video stream. During encoding of a video stream, context adaptive variable length coding (CAVLC) may be used. More specifically, the present invention relates to a video decoder that utilizes CAVLC. While the following discussion relates to a video system, it should be understood that the present invention may be used in any system that utilizes coding schemes.

A video stream may be encoded using an encoding scheme such as the encoder described by U.S. patent application Ser. No. 10/963,677 filed Dec. 13, 2004 entitled "Video Decoder with Deblocker within Decoding Loop." Accordingly, U.S. patent application Ser. No. 10/963,677 filed Dec. 13, 2004 is hereby incorporated herein by reference in its entirety.

Figure 1:
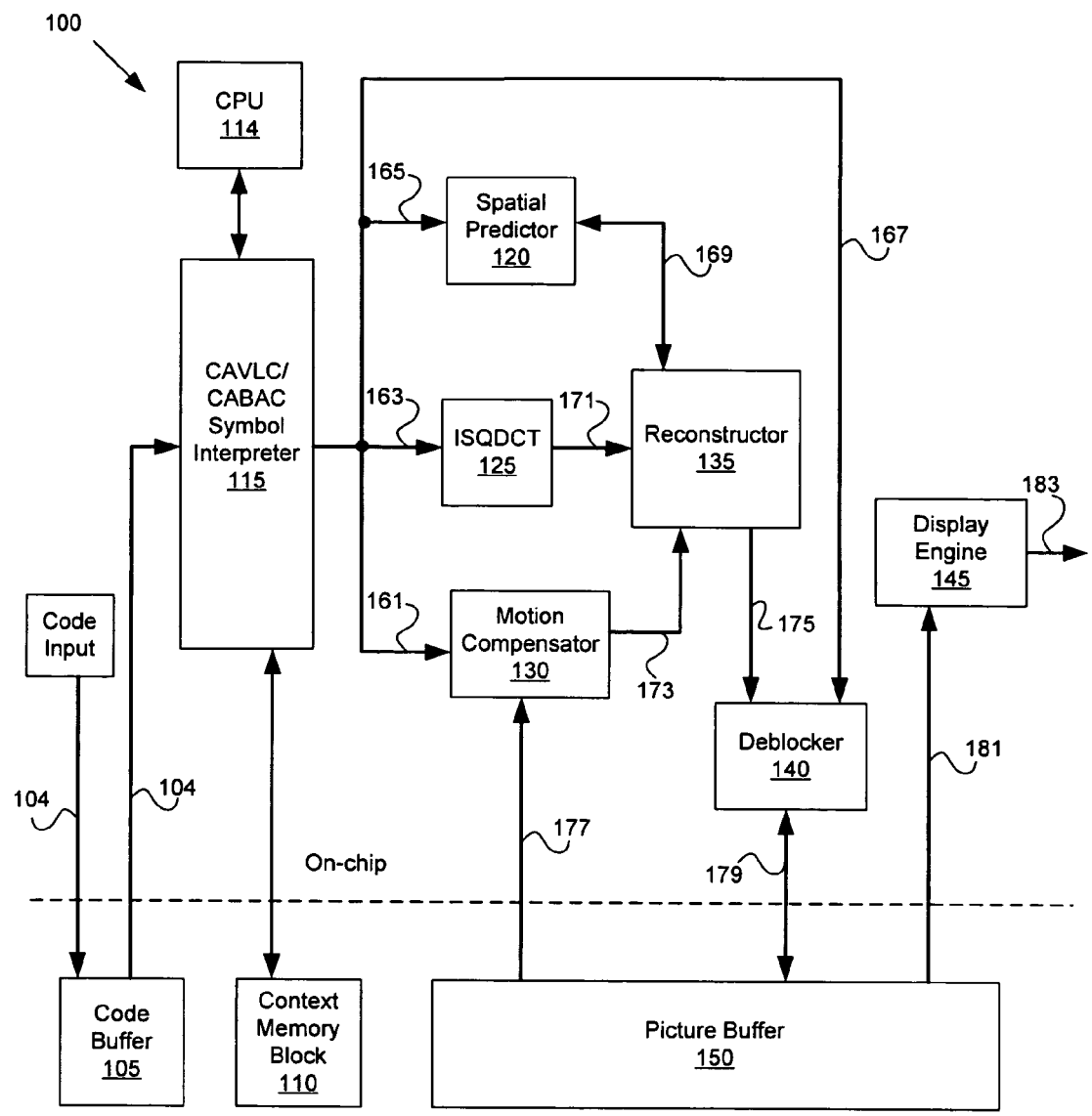
FIG. 1 illustrates a block diagram of an exemplary video decoder, in accordance with an embodiment of the present invention.

FIG. 1 illustrates a block diagram of an exemplary video decoder 100, in accordance with an embodiment of the present invention. The video decoder 100 may comprise a code buffer 105, a symbol interpreter 115, a context memory block 110, a CPU 114, a spatial predictor 120, an inverse scanner, quantizer, and transformer (ISQDCT) 125, a motion compensator 130, a reconstructor 135, a deblocker 140, a picture buffer 150, and a display engine 145.

The code buffer 105 may comprise suitable circuitry, logic and/or code and may be adapted to receive and buffer the video elementary stream 104 prior to interpreting it by the symbol interpreter 115. The video elementary stream 104 may be encoded in a binary format using Context Adaptive Binary Arithmetic Coding (CABAC) or CAVLC, for example. Depending on the encoding method, the code buffer 105 may be adapted to output different length of the elementary video stream as may be required by the symbol interpreter 115. The code buffer 105 may comprise a portion of a memory system such as, for example, a dynamic random access memory (DRAM).

The symbol interpreter 115 may comprise suitable circuitry, logic and/or code and may be adapted to interpret the elementary video stream 104 to obtain quantized frequency coefficients information and additional side information necessary for decoding the elementary video stream 104. The symbol interpreter 115 may also be adapted to interpret either CABAC or CAVLC encoded video stream, for example. In an embodiment of the present invention, the symbol interpreter 115 may comprise a CAVLC decoder and a CABAC decoder. Quantized frequency coefficients 163 may be communicated to the ISQDCT 125, and the side information 161 and 165 may be communicated to the motion compensator 130 and the spatial predictor 120, respectively. Depending on the prediction mode for each macroblock associated with an interpreted set of quantized frequency coefficients 163, the symbol interpreter 115 may provide side information either to a spatial predictor 120, if spatial prediction was used during encoding, or to a motion compensator 130, if temporal prediction was used during encoding. The side information 161 and 165 may comprise prediction mode information and/or motion vector information, for example.

In order to increase processing efficiency, a CPU 114 may be coupled to the symbol interpreter 115 to coordinate the interpreting process for each macroblock within the bitstream 104. In addition, the symbol interpreter 115 may be coupled to a context memory block 110. The context memory block 110 may be adapted to store a plurality of contexts that may be utilized for interpreting the CABAC and/or CAVLC-encoded bitstream. The context memory 110 may be another portion of the same memory system as the code buffer 405, or a portion of another memory system, for example.

After interpreting by the symbol interpreter 115, sets of quantized frequency coefficients 163 may be communicated to the ISQDCT 125. The ISQDCT 125 may comprise suitable circuitry, logic and/or code and may be adapted to generate the prediction error E 171 from a set of quantized frequency coefficients received from the symbol interpreter 115. For example, the ISQDCT 125 may be adapted to transform the quantized frequency coefficients 163 back to spatial domain using an inverse transform. After the prediction error E 171 is generated, it may be communicated to the reconstructor 135.

The spatial predictor 120 and the motion compensator 130 may comprise suitable circuitry, logic and/or code and may be adapted to generate prediction pixels 169 and 173, respectively, utilizing side information received from the symbol interpreter 115. For example, the spatial predictor 120 may generate the prediction pixels P 169 for spatially predicted macroblocks, while the motion compensator 130 may generate prediction pixels P 173 for temporally predicted macroblocks. The prediction pixels P 173 may comprise prediction pixels $P_0$ and $P_1$, for example, obtained from frames/fields neighboring the current frame/field. The motion compensator 130 may retrieve the prediction pixels $P_0$ and $P_1$ from the picture buffer 150 via the connection 177. The picture buffer 150 may store previously decoded frames or fields.

The reconstructor 135 may comprise suitable circuitry, logic and/or code and may be adapted to receive the prediction error E 171 from the ISQDCT 125, as well as the prediction pixels 173 and 169 from either the motion compensator 130 or the spatial predictor 120, respectively. The pixel reconstructor 135 may then reconstruct a macroblock 175 from the prediction error 171 and the side information 169 or 173. The reconstructed macroblock 175 may then be communicated to a deblocker 140, within the decoder 100.

If the spatial predictor 120 is utilized for generating prediction pixels, reconstructed macroblocks may be communicated back from the reconstructor 135 to the spatial predictor 120. In this way, the spatial predictor 120 may utilize pixel information along a left, a corner or a top border with a neighboring macroblock to obtain pixel estimation within a current macroblock.

The deblocker 140 may comprise suitable circuitry, logic and/or code and may be adapted to filter the reconstructed macroblock 175 received from the reconstructor 135 to reduce artifacts in the decoded video stream. The deblocked macroblocks may be communicated via the connection 179 to the picture buffer 150.

The picture buffer 150 may be adapted to store one or more decoded pictures comprising deblocked macroblocks received from the deblocker 140 and to communicate one or more decoded pictures to the display engine 145 and to the motion compensator 130. In addition, the picture buffer 150 may communicate a previously decoded picture back to the deblocker 140 so that the deblocker may deblock a current macroblock within a current picture.

A decoded picture buffered in the picture buffer 150 may be communicated via the connection 181 to a display engine 145. The display engine may then output a decoded video stream 183. The decoded video stream 183 may be communicated to a video display, for example.

The symbol interpreter 115 may generate the plurality of quantized frequency coefficients from the encoded video stream. The video stream 104 received by the symbol interpreter 115 may be encoded utilizing CAVLC and/or CABAC. In this regard, the symbol interpreter 115 may comprise a CAVLC interpreter and a CABAC interpreter, for example, which may be adapted to interpret CAVLC and/or CABAC-encoded symbols, respectively. After symbol interpretation, the symbol interpreter may communicate quantized frequency coefficients 163 to the ISQDCT 125, and side information 165 and 161 to the spatial predictor 120 and the motion compensator 130, respectively.

During encoding of a video stream, the pictures comprising the video may be turned into symbols representing different types of information such as, for example, color information, error information, temporal information, motion vectors, transform coefficients, etc. The symbols make up the coded stream, which may then be encoded further based on probability of occurrence of certain strings of bits representing the symbols using CAVLC. Using CAVLC, certain strings of bits may be grouped together and may have a larger probability of occurrence, and as a result may be represented with a smaller number of bits. Similarly, using CAVLC, other strings of bits may be grouped together and may have a smaller probability of occurrence, and as a result may be represented with a larger number of bits, Alternatively, the symbols of the video data stream may be represented by bins of data and encoded using CABAC. The coded video stream 104 may be coded using either CAVLC or CABAC. The table below illustrates exemplary CAVLC coding.

| Code Word | UE | SE |
|---|---|---|
| 1 | 0 | 0 |
| 010 | 1 | 1 |
| 011 | 2 | −1 |
| 00100 | 3 | 2 |
| 00101 | 4 | −2 |
| 00110 | 5 | 3 |
| 00111 | 6 | −3 |
| 0001000 | 7 | 4 |
| 0001001 | 8 | −4 |

For example, unsigned numbers 0-8 may be coded as shown above, where 0 may be represented with one bit, 1 and 2 may be represented using three bits, 3, 4, 5 and 6 may be represented using five bits, and so forth. Signed numbers may be encoded using a similar technique, as shown above. For example, a motion vector may comprise 2 numbers, an X value, and a Y value, which may be 1 and −1 respectively, and may get encoded as 010011. When decoding, the first bit may be looked at, if it is 1, then that indicates, in the unsigned number example, that the number sent is 0. Is the first bit is 0, then the next bit needs to be examined, if it is 1, then the number is either 1 or 2, depending on the value of the third bit, and so forth.

Referring to FIG. 1, the coded stream 104 may be received and stored in the code buffer 105. If the coded stream 104 was encoded using CABAC, then the CABAC coded stream may be converted to bins, which may be stored in a bin buffer. The bins may then go to the symbol interpreter 115 to be decoded. If the coded stream 104 was encoded using CAVLC, then the CAVLC coded stream may go to the symbol interpreter 115 to be decoded.

Figure 2:
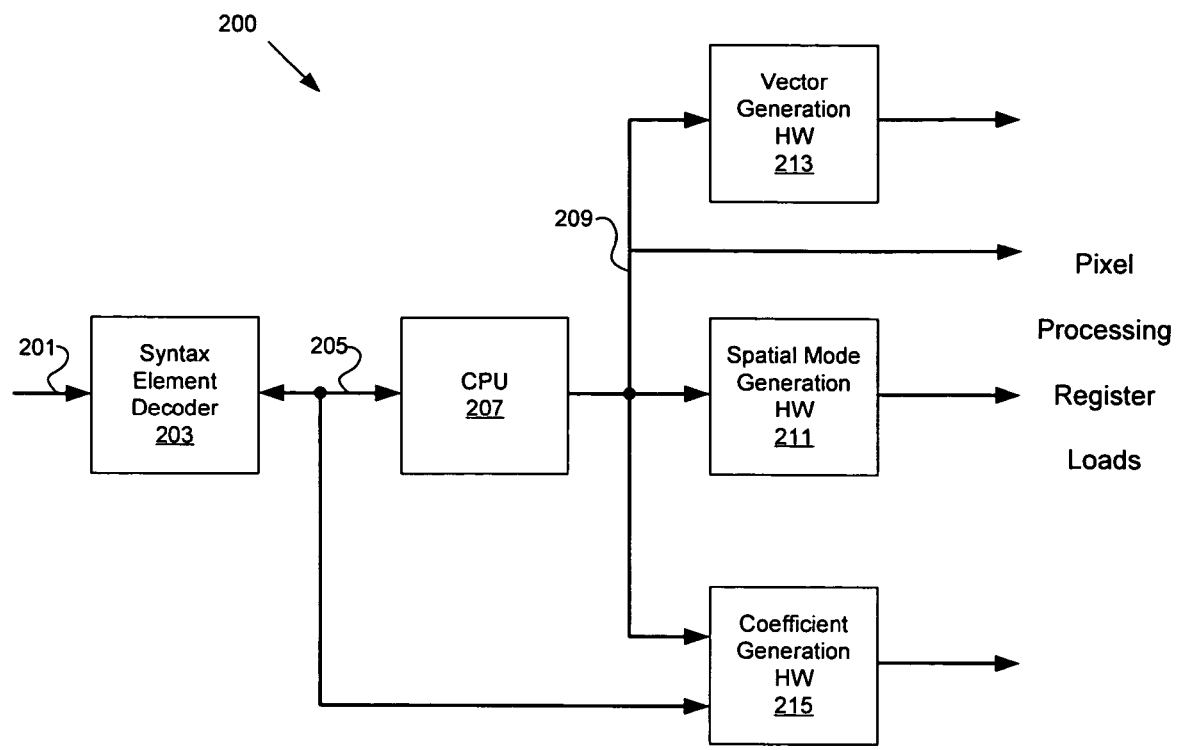
FIG. 2 illustrates an exemplary block diagram of the symbol interpreter, in accordance with an embodiment of the present invention.

FIG. 2 illustrates an exemplary block diagram of a symbol interpreter 200, in accordance with an embodiment of the present invention. The symbol interpreter 200 may be the symbol interpreter 115 of FIG. 1, for example. Referring to FIG. 2, the symbol interpreter 200 may comprise a syntax element decoder 203, a CPU 207, vector generation hardware 213, spatial mode generation hardware 211, and coefficient generation hardware 215.

The syntax element decoder 203 may comprise suitable circuitry, logic and/or code and may be adapted to receive the coded data 201. The coded data may be the CAVLC symbols or the CABAC symbols that may have been converted to bins. Based on the coded data 201, the CPU 207 may pass information regarding the type of coding used to encode the data and the type of coded data to the syntax element decoder 203. The CPU 207 may then instruct the syntax element decoder 203 to use an appropriate table for the type of CAVLC that may have been used to code the data. The syntax element decoder 203 may then decode the coded data 201 to produce decoded data 205. The CPU 207 may then perform more processing on the decoded data 205 to determine which part of the system the decoded data 205 should go to, for example. The processed decoded data 209 may then go to the appropriate portion of the system. For example, vector-related data may be routed to vector generation hardware 213, spatial-related data may go to spatial mode generation hardware 211, and coefficient-related data may go to the coefficient generation hardware 215, etc. The decoded data may comprise syntax elements, which may be converted by the appropriate hardware to the appropriate symbols that may represent data of the pictures comprising the video.

Both the CABAC and CAVLC data may be both decoded using the same method as that for the CAVLC since the CABAC and CAVLC symbols may be encoded using a variable length coding scheme such as, for example, Huffman coding. Once the CABAC bins are extracted, the coded data 201 may be either CABAC or CAVLC, and the tables used to decode the coded data 201 into the syntax elements 205 may depend on whether the data was CABAC coded or CAVLC coded.

Figure 3:
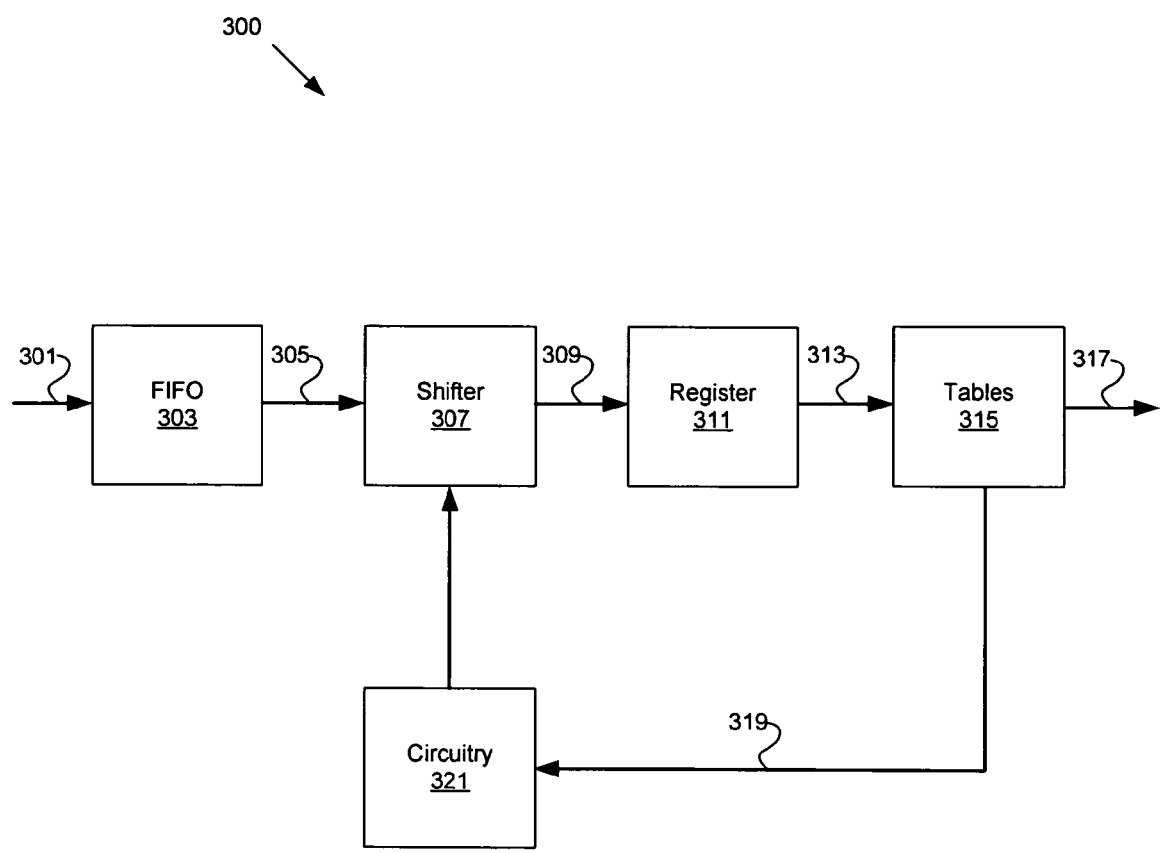
FIG. 3 illustrates a block diagram of an exemplary syntax element decoder, in accordance with an embodiment of the present invention.

FIG. 3 illustrates a block diagram of an exemplary syntax element decoder 300, in accordance with an embodiment of the present invention. The syntax element decoder 300 may be the syntax element decoder 203 of FIG. 2, for example. Referring to FIG. 3, the syntax element decoder 300 may comprise a FIFO buffer 303, a shifter 307, a register 311, tables 315, and circuitry 321.

The FIFO buffer 303 may be adapted to receive the coded data 301. The coded data 301 may be the CAVLC symbols or the CABAC symbols that may have been converted to bins. The coded data 301 may come into the FIFO buffer 303, which may then send a chunk of data 305 to the shifter 307, where the chunk of data 305 may be 32 bits of coded data 301. Initially, when the chunk of data 305 is sent the shifter may not do anything. Depending on the size of the first code word to decode, the shifter 307 may send the code word 309 with the appropriate number of bits to the register 311. For example, if the first code word is five bits, the shifter 307 may send 5 bits starting at bit 0 of the 32 bits to the register 311.

A CPU such as, for example, the CPU 207 of FIG. 2 may select a table appropriate for the type of code word to be decoded. The type of table may depend on the different probabilities associated with the code words, or the type of code word such as, for example, whether the code word is a coefficient, a motion vector, etc. Referring to FIG. 3, the register 311 may send the code word 313 to be looked up in the appropriately selected table 315. The table 315 may then send out the decoded word 317 associated with the input code word 313. The table 315 may also output the size 319 of the code word 313 and send it to the circuitry 321. The circuitry 321 may then shift the contents of the shifter 307 by the size 319 such that the contents of the shifter 307 start at position 0, so when the next code word is read it may be read starting at position 0, which may be easier than attempting to read the code word from an offset location within the shifter. So, for the example above with the 5-bit code word, the size 319 may be 5, and the circuitry 321 may shift the contents of the shifter 307 by 5 positions. In an embodiment of the present invention, the table 315 may contain the values corresponding to a code word and the size of the code word.

Figure 4:
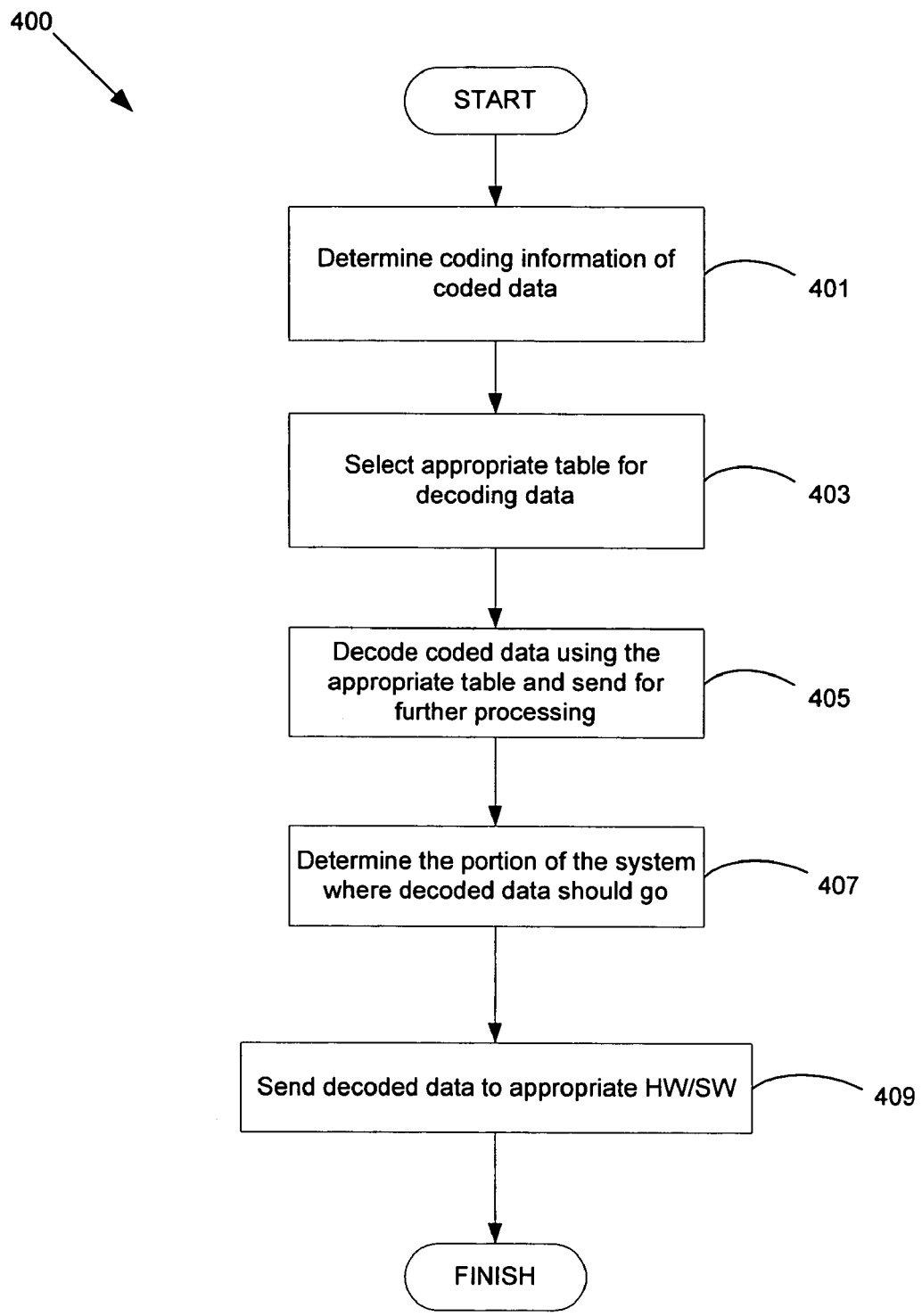
FIG. 4 illustrates a flow diagram of an exemplary method for decoding a CAVLC encoded data stream, in accordance with an embodiment of the invention.

FIG. 4 illustrates a flow diagram of an exemplary method 400 for decoding a CAVLC encoded data stream, in accordance with an embodiment of the invention. At 401, a stream of coded data may be used to obtain information regarding the type of coding that was used to code the data and the type of data. The information regarding the coded data may then be utilized at 403 to provide appropriate instructions for decoding the coded data such as, for example, a table with appropriate decoding information. At 405 the coded data may be decoded using the appropriate type of table and the decoded data may be transmitted for further processing. At 407, it may be determined which part of the system the decoded data should go, and at 409, the decoded data may be sent to the appropriate hardware, software, or a combination thereof.

In an embodiment of the present invention, a symbol interpreter such as, for example, the symbol interpreter 200 of FIG. 2 may perform the method 400 of FIG. 4. A syntax element decoder such as, for example, the syntax element decoder 203 may be capable of determining the coding information of an input comprising coded data, and decoding the coded data using an appropriate table, which may be provided by a CPU such as, for example, the CPU 207 of FIG. 2. The CPU 207 may also determine the portion of the system where decoded data should go and send the decoded data to the appropriate portion of the system.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method that processes encoded data, wherein said encoded data is encoded with content adaptive variable length coding, the method comprising:

selecting decoding information based on characteristics of the encoded data with content adaptive variable length coding;

decoding the encoded data with content adaptive variable length coding using the selected decoding information; and generating symbols based on the decoded data and the destination of the decoded data; and wherein the generating the symbols based on the decoded data and the destination of the decoded data further comprises generating the symbols based on a prediction mode associated with the decoded data.

2. The method according to claim 1 wherein the encoded data comprises an encoded video stream.

3. The method according to claim 1 wherein the characteristics of the encoded data comprise the destination of the decoded data.

4. The method according to claim 1 wherein the characteristics of the encoded data comprise the method used for encoding the encoded data.

5. The method according to claim 1 wherein selecting decoding information comprises:
(a) buffering the encoded data;
(b) selecting a number of bits that comprise a code word;
(c) determining the characteristics of the code word;
(d) selecting decoding information based on the characteristics;
(e) shifting the buffered encoded data by the number of bits of the code word; and
(f) repeating (b) through (e) for a next code word.

6. The method according to claim 1 wherein the decoding information comprises lookup tables.

7. A system that processes encoded data, the system comprising:

at least one processor capable of selecting decoding information based on characteristics of the encoded data;

the at least one processor capable of decoding the encoded data using the selected decoding information;

the at least one processor capable of generating symbols based on the decoded data and the destination of the decoded data;

wherein the encoded data is variable length coded; and wherein the destination is one of a motion compensator and a spatial predictor and wherein generating the symbols based on the decoded data and the destination of the decoded data further comprises generating the symbols based on the decoded data and whether the destination of the decoded data is a spatial predictor or a motion compensator.

8. The system according to claim 7 wherein the encoded data comprises an encoded video stream.

9. The system according to claim 7 wherein the characteristics of the encoded data comprise the destination of the decoded data.

10. The system according to claim 7 wherein the characteristics of the encoded data comprise the method used for encoding the encoded data.

11. The system according to claim 7 for selecting decoding information the system further comprising:
(a) the at least one processor capable of buffering the encoded data;
(b) the at least one processor capable of selecting a number of bits that comprise a code word;
(c) the at least one processor capable of determining the characteristics of the code word;
(d) the at least one processor capable of selecting decoding information based on the characteristics;

(e) the at least one processor capable of shifting the buffered encoded data by the number of bits of the code word; and (f) the at least one processor capable of repeating (b) through (e) for a next code word.

12. The system according to claim 7 wherein the decoding information comprises lookup tables.

13. The system according to claim 7 further comprising memory.

14. The system according to claim 13 wherein the decoding information is stored in the memory.

15. The system of claim 7, wherein the generating the symbols based on the decoded data and the destination of the decoded data further comprises generating the symbols based on a prediction mode associated with the decoded data.

16. The system of claim 7, wherein generating the symbols further comprises generating side information.

17. The system of claim 16, wherein the side information comprises motion vectors if the destination is a motion compensator.

18. A machine-readable storage having stored thereon, a computer program having at least one code section that processes encoded data, the at least one code section being executable by a machine for causing the machine to perform steps comprising:

selecting decoding information based on characteristics of the encoded data;

decoding the encoded data using the selected decoding information;

generating symbols based on the decoded data and the destination of the decoded data; and wherein the encoded data is variable length coded; and wherein generating the symbols further comprises generating side information, wherein the side information comprises motion vectors if the destination is a motion compensator.

19. The machine-readable storage according to claim 18 wherein the encoded data comprises an encoded video stream.

20. The machine-readable storage according to claim 18 wherein the characteristics of the encoded data comprise the destination of the decoded data.

21. The machine-readable storage according to claim 18 wherein the characteristics of the encoded data comprise the method used for encoding the encoded data.

22. The machine-readable storage according to claim 18 wherein the code for selecting decoding information comprises:

(a) code for buffering the encoded data;

(b) code for selecting a number of bits that comprise a code word;

(c) code for determining the characteristics of the code word;

(d) code for selecting decoding information based on the characteristics;

(e) code for shifting the buffered encoded data by the number of bits of the code word; and (f) code for repeating (b) through (e) for a next code word.

23. The machine-readable storage according to claim 18 wherein the decoding information comprises lookup tables.

24. A system for performing decoding data encoded with lossless encoding and lossy encoding, said system comprising:

a circuit for decoding the lossless encoding;

a plurality of circuits for decoding the lossy encoding;

wherein the circuit for decoding the lossless encoding determines during decoding a portion of the encoded data, a particular one of the plurality of circuits for decoding the lossy encoding of the portion of the data; and wherein the circuit for decoding the lossless encoding generates additional symbols based on the particular one of the plurality of circuits determined for decoding the lossy encoding of the portion of the data.

25. The system of claim 24, wherein the circuit for decoding the lossless encoding further comprises:

a variable length decoder.

26. The system of claim 25, wherein the circuit for decoding the lossless encoding further comprises:

a content adaptive variable length coding decoder.

27. The system of claim 25, wherein the circuit for decoding the lossless encoding further comprises:

a content adaptive binary arithmetic coding decoder.

28. The system of claim 25, wherein the plurality of circuits for decoding the lossy encoding further comprises:

a motion compensator for motion compensating; and a spatial predictor for spatial predicting.

* * * * *